United States Patent

Tanaka et al.

[11] Patent Number: 5,322,319
[45] Date of Patent: Jun. 21, 1994

[54] ACTIVE SUSPENSION APPARATUS FOR A VEHICLE

[75] Inventors: Tadao Tanaka; Takao Morita; Akihiko Togashi; Naohiro Kishimoto; Hiroaki Yoshida, all of Aichi, Japan

[73] Assignee: Mitsubishi Jidosha Kogyo Kabushiki Kaisha, Tokyo, Japan

[21] Appl. No.: 965,707

[22] Filed: Oct. 23, 1992

Related U.S. Application Data

[63] Continuation-in-part of Ser. No. 757,598, Sep. 11, 1991, abandoned.

[30] Foreign Application Priority Data

Sep. 17, 1990 [JP] Japan .................. 2-246728

[51] Int. Cl.⁵ .............................. B60G 17/06
[52] U.S. Cl. .................. 280/707; 364/424.05
[58] Field of Search ............ 280/707, DIG. 1, 689, 280/772, 112.2, 6.12, 714, 709; 364/424.05

[56] References Cited

U.S. PATENT DOCUMENTS

| | | | |
|---|---|---|---|
| 3,003,783 | 10/1961 | Brueder | 280/707 |
| 4,513,833 | 4/1985 | Sheldon | 188/299 |
| 4,595,072 | 6/1986 | Barnea | 280/707 |
| 4,770,438 | 9/1988 | Sugasawa | 280/707 |
| 4,825,370 | 4/1989 | Kurosawa | 280/707 |

FOREIGN PATENT DOCUMENTS

| | | | |
|---|---|---|---|
| 1510 | 1/1986 | Japan | 280/707 |
| 235213 | 10/1986 | Japan | 280/707 |
| 88604 | 4/1987 | Japan | 280/707 |

Primary Examiner—Karin L. Tyson

[57] ABSTRACT

An active suspension apparatus is provided for a vehicle which includes an actuator being extensible and retractable and provided between a vehicle body and a wheel so that the force of the vehicle body to support the wheel is adjustable, a sprung G sensor or a vehicle height sensor for detecting a vibration input to the vehicle body, and a control valve and a controller for controlling the supporting force of the actuator in accordance with the vibration input detected by the sprung G sensor or the vehicle height sensor, and thereby restraining the stroke of the actuator. The suspension apparatus further comprises a forward road surface sensor for detecting the size of irregularities of a road surface in front of the vehicle, and the control valve and the controller are adapted to execute normal control such that the equivalent spring constant of the actuator is adjusted to a first spring constant when a surface irregularity of a size larger than a predetermined size is detected by the forward road surface sensor, and to execute inverse spring control such that the equivalent spring constant of the actuator is adjusted to a second spring constant lower than the first spring constant, and thereby lengthening the stroke of the wheel, when no surface irregularity of a size larger than the predetermined size is detected by the forward road surface sensor. As a result, the ride is greatly improved when the vehicle runs on a smooth road.

23 Claims, 7 Drawing Sheets

F I G. 9
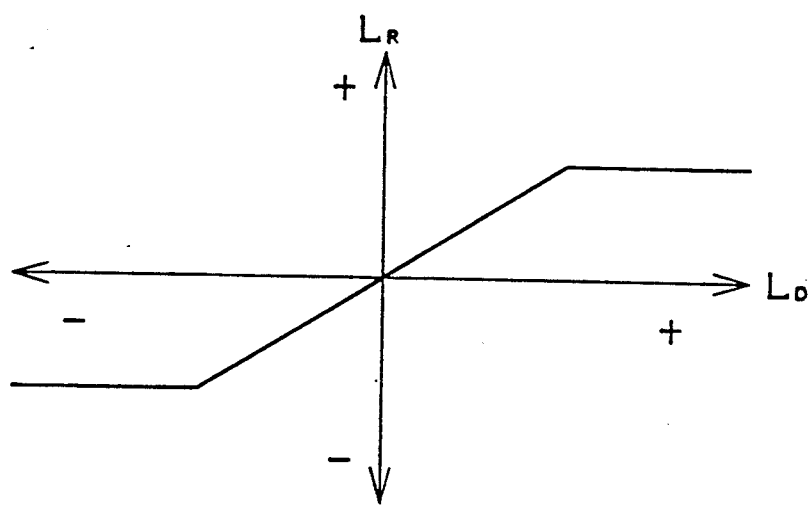

ACTIVE SUSPENSION APPARATUS FOR A VEHICLE

This is a continuation in part of Ser. No. 757,598, filed Sep. 11, 1991, now abandoned.

FIELD OF THE INVENTION

The present invention relates to a vehicular suspension control apparatus used in a vehicle, such as an automobile, and adapted to detect the conditions of a road surface in front of the vehicle so that the vehicle is made more comfortable to ride in by properly controlling the vehicular suspension control apparatus with an actuator.

2. Description of the Related Art

Conventionally proposed in Published Unexamined Japanese Patent Application No. 63-41215 (U.S. Pat. No. 4,787,649; EP No. 255,720) is a so-called active suspension apparatus which absorbs and reduces vertical vibration of a vehicle. In this suspension apparatus, a hydraulic actuator is provided between the vehicle body and each wheel, a cylinder chamber of the actuator is connected to an accumulator through an orifice, and a control valve is installed in an oil passage through which hydraulic oil is supplied from an oil pump to the cylinder chamber of each actuator. In controlling the vertical vibration of the vehicle by means of this active suspension apparatus, the control valve is controlled by a controller, on the basis of information from a vehicle height sensor or a sprung G sensor, whereby a vibration in the vehicle body is reduced. While, a vibration with such a relatively high frequency that cannot be followed up by the control valve is damped by the orifice in cooperation with the accumulator.

To describe a more detailed function of the above active suspension apparatus, the distance between the vehicle body and each wheel, that is, the vehicle height, is detected by the vehicle height sensor. If the vehicle height is smaller than a target height, that is, when the vehicle body is going to sink, the hydraulic oil is discharged from the cylinder chamber of each hydraulic actuator, depending on the depth of sinking. In case of bumping, on the other hand, the hydraulic actuator is given a spring function by the oil forced in, depending on the depth of bumping. Thus, the spring constant is equivalently controlled by adjusting the supply and discharge of the hydraulic oil to and from the actuator in accordance with the change of the vehicle height.

In the conventional active suspension apparatus arranged in this manner, vertical vibration of the vehicle body caused by undulation of a road surface can be satisfactorily restrained.

However, the active suspension apparatus is actually designed so that the equivalent spring constant of the suspension is relatively high enough for the vehicle to satisfactorily provide a comfortable ride, with regard to a relatively wide variety of road conditions, including rough roads, in order to prevent the hydraulic actuator from bottoming when the hydraulic actuator is subjected to impulsive vibrations produced when the vehicle runs over protuberances on a road surface or joints in a paved road.

In other words, the vehicle is not comfortable enough to ride in when it runs on a smooth road such that no protuberances or the like produce impulsive vibrations.

SUMMARY OF THE INVENTION

The object of the present invention is to provide an active suspension apparatus for a vehicle, in which the equivalent spring constant of a suspension is optimally controlled so that the vehicle runs on a smooth road with a greatly improved comfortable ride.

In order to achieve the above object, an active suspension apparatus for a vehicle having a body and a wheel, comprising an actuator being extensible and retractable and provided between the vehicle body and the wheel so that the force of the vehicle body to support the wheel is adjustable, vibration input sensing means for detecting a vibration input to the vehicle body, control means for controlling the supporting force of the actuator in accordance with the vibration input detected by the vibration input sensing means, thereby restraining the stroke of the wheel, and a forward road surface sensor for detecting the size of irregularities of a road surface in front of the vehicle, and said control means controlling the supporting force of said actuator based on the vibration input detected by said vibration input sensing means, to execute inverse spring control such that the equivalent spring constant of a suspension is lowered, thereby lengthening the stroke of the wheel, while no surface irregularity of a size larger than a predetermined size is detected by said forward road surface sensor.

According to the present invention, the forward road surface sensor is operable to detect a load surface irregularity, such as a protuberance or a stepped portion, of a size larger than the predetermined size, before the vehicle runs over the load surface irregularity. When the load surface irregularity of a size larger than the predetermined size is detected, the actuator is controlled, similar to the normal control, in such a manner that an equivalent spring constant of the entirety of a suspension is stiffened, so that an impulsive vibration input, which would be generated if the vehicle runs over the load surface irregularity of a size larger than the predetermined size, is fully absorbed, and so that the actuator is prevented from bottoming. When the vehicle runs on a smooth road such that no surface irregularity of a size larger than the predetermined size is detected by the forward road surface sensor, on the other hand, the inverse spring control is executed to promote or lengthen the stroke of the actuator, by adjusting a force applied from the actuator, interposed between the wheel and the vehicle body, to the vehicle body (hereinafter referred to as the supporting force of the actuator) in such a manner that the equivalent spring constant of the suspension becomes lower than that in the case of the normal control, by increasing the supporting force of the actuator when the suspension is in an expanded state and by decreasing the supporting force when the suspension is in a contracted state. Thus, the vehicle can provide a soft feeling and a greatly improved and more comfortable ride when the vehicle runs on a smooth road.

Preferably, according to the present invention, the active suspension apparatus includes vehicle height sensing means for detecting the relative distance between the wheel and the vehicle body, and the control means does not execute the inverse spring control when the relative distance detected by the vehicle height sensing means is longer than a predetermined relative distance. Thus, the stroke of the wheel is prevented from being excessively lengthened, and a more comfortable ride is provided without any adverse effects when the vehicle runs on a smooth road.

Moreover, the suspension apparatus according to the present invention further comprises vehicle speed sensing means for detecting the speed of the vehicle, and the control means does not execute the inverse spring control when the vehicle speed detected by the vehicle speed sensing means is higher than a predetermined vehicle speed. Thus, the high-speed running stability of the vehicle is ensured.

Preferably, furthermore, the suspension apparatus according to the present invention further comprises steering angle sensing means for detecting the steering angle of the vehicle, and the control means does not execute the inverse spring control when the absolute value of the steering angle detected by the steering angle sensing means is larger than the value of a predetermined steering angle. Thus, the vehicle can be turned with satisfactory driving stability.

The above and other objects, features, and advantages of the invention will be more apparent from the ensuing detailed description taken in connection with the accompanying drawings.

BRIEF DESCRIPTION OF THE DRAWINGS

FIG. 2 is a schematic view illustrating the way a preview sensor detects a protuberance or the like;

FIG. 9 is a graph showing a relationship between an amount $L_D$ of stroke change and a correction value $L_R$ which is set in dependence on the stroke change amount $L_D$ and is used for correction of a target stroke $L_1$.

DETAILED DESCRIPTION OF THE PREFERRED EMBODIMENTS

Figure 1:
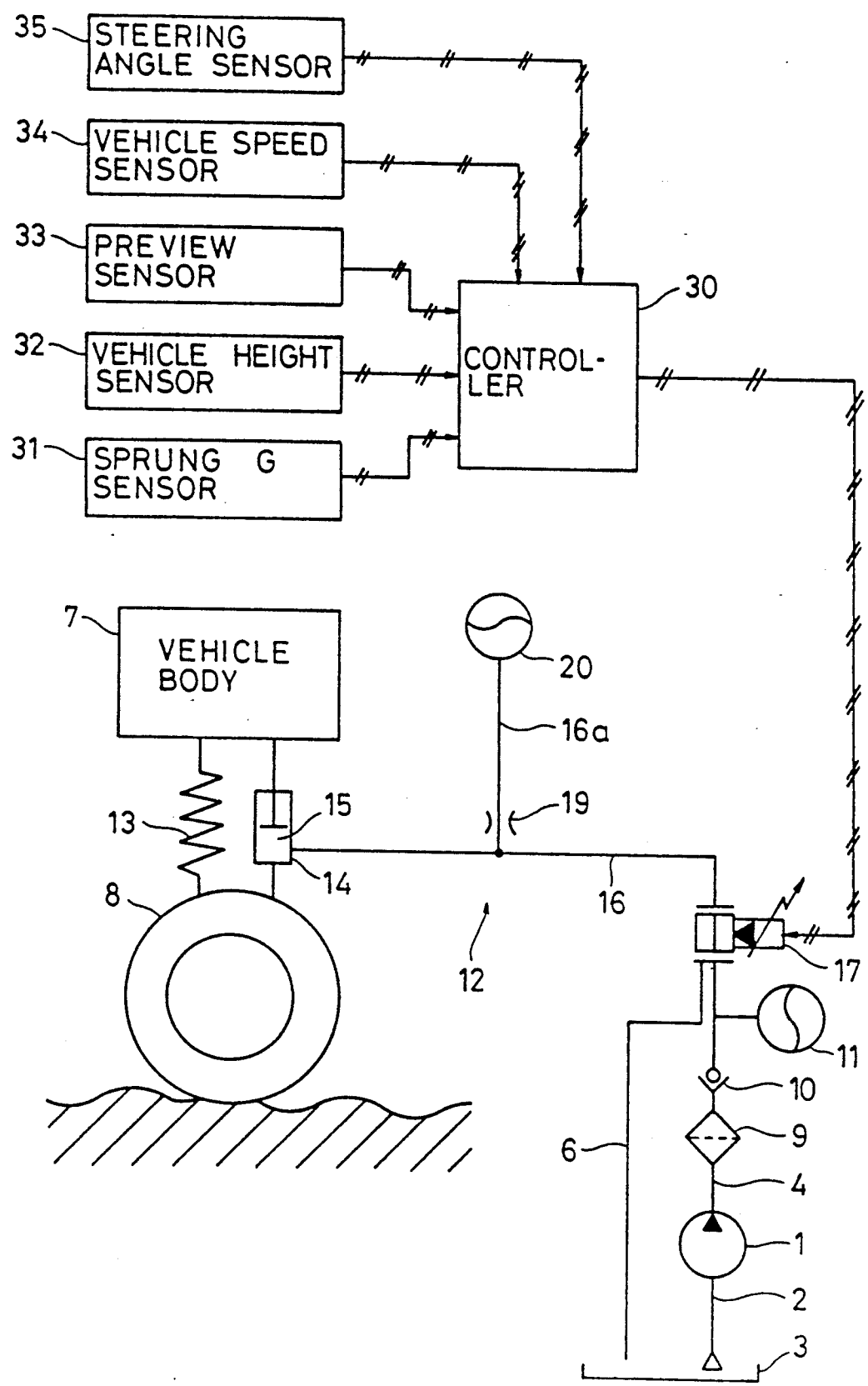
FIG. 1 is a block diagram schematically showing a construction of a vehicular active suspension apparatus according to an embodiment of the present invention.

FIG. 1 shows an arrangement of a hydraulic active suspension apparatus of an automobile. As shown in FIG. 1, a suspension unit 12 is attached to each of the wheels, i.e., front-right, front-left, rear-right, and rear-left wheels. A suspension spring 13 of the suspension unit 12 and a hydraulic actuator 14, which is formed of a single-acting hydraulic cylinder, are provided between a vehicle body 7 and their corresponding wheel 8. The suspension unit 12 shown in FIG. 1 is representing one suspension unit combined with one of the wheels.

A control valve 17 is installed between an oil passage 16, which communicates with a cylinder chamber 15, and supply and discharge oil passages 4 and 6 (as will be described in detail later). One end of a branch 16a is connected to the middle portion of the oil passage 16, and an accumulator 20 is connected to the other end of the branch passage 16a. A gas is sealed in the accumulator 20, and its compressibility provides the so-called gas spring effect. An orifice 19 is arranged in the branch passage 16a. The orifice 19 regulates the amount of hydraulic oil flow between the accumulator 20 and the cylinder chamber 15 of the hydraulic actuator 14, for thereby damping vibrations. Thus, the hydraulic actuator 14 is interposed between the vehicle body and its corresponding wheel for expansion/contraction, and the oil pressure in the hydraulic cylinder 15 is controlled by the control valve 17 having characteristics, as will be described later, whereby the aforementioned supporting force of the actuator by which the vehicle body is supported is increased and decreased, so that a relative displacement between the vehicle body and the wheel can be variably changed in response to the supply and discharge of the oil to the hydraulic cylinder 15.

The other end of the supply oil passage 4 is connected to the discharge side of the oil pump 1. The suction side of the oil pump 1 communicates with the inside of a reservoir 3 by an oil passage 2. When the oil pump 1 is operated, therefore, the hydraulic oil stored in the reservoir 3 is discharged toward the supply oil passage 4 by the oil pump 1. An oil filter 9, a check valve 10, and an accumulator 11 for accumulating line pressure are arranged in the supply oil passage 4, in the order named from the side of the oil pump 1. The check valve 10 allows the hydraulic oil to flow only from the oil pump 1 side toward the suspension unit 12. With the use of this check valve 10, the hydraulic oil can be stored at high pressure in the accumulator 11.

The control valve 17 is of a type such that its opening is changed in proportion to the value of an electric current supplied thereto. Based on this valve opening, the oil supply and discharge between the supply oil passage 4 and the discharge oil passage 6, that is, an oil pressure for the hydraulic actuator 14, is controlled. The control valve 17 is designed so that if the value of the current supplied thereto is larger, the oil pressure in the hydraulic actuator 14 and the resulting supporting force are increased in proportion. The hydraulic oil discharged from the control valve 17 toward the discharge oil passage 6 is returned to the reservoir 3.

The control valve 17 is connected electrically to the output side of a controller 30. The operation of the valve 17 is controlled by a driving signal from the controller 30. Various sensors for controlling the suspension unit 12 are connected to the input side of the controller 30. Among these sensors, a sprung G sensor 31, which is provided for each wheel, is used to detect a vertical acceleration acting on the vehicle body. A vehicle height sensor 32, which is provided for each wheel, constitutes a vehicle height sensing unit for detecting the stroke of the wheel 8 relative to the vehicle body 7. A preview sensor 33, which constitutes a forward road surface sensor, detects irregularities, such as protuberances, on the road surface in front of the vehicle, and delivers an output signal of a value corresponding to the size of each protuberance or the like. A vehicle speed sensor 34, which constitutes a vehicle speed sensing unit, is used to detect the running speed of the vehicle, that is, a vehicle speed V. A steering angle sensor 35, which constitutes a steering angle sensing unit, is used to detect the steering angle of the vehicle. The control valve 17 and the controller 30 constitute a control unit, while the sprung G sensor 31 and the vehicle height sensor 32 constitute a vibration input sensing unit. In the present embodiment, the vehicle height sensor 32 for detecting the stroke of the wheel 8 is used as the vehicle height sensing unit. Alternatively, however, the vehicle height sensing unit may be any other suitable sensor which detects the distance between each wheel 8 and the vehicle body 7.

Figure 2:
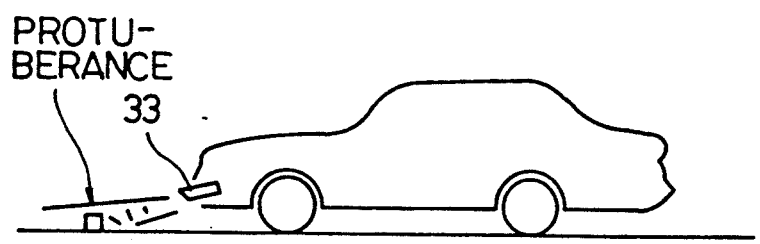

Further, an ultrasonic sensor is used as the preview sensor 33, for example. The preview sensor 33 is mounted on the front portion of the vehicle body so that the preview sensor 33 is directed forward and diagonally downward (see FIG. 2). The preview sensor 33 detects the irregularities of the road surface by the reflected waves produced when an ultrasonic wave delivered from the preview sensor 33 is reflected by the irregularities such as protuberances.

The operation of the control valve 17, which will be described in detail later, is controlled by the controller 30 in response to detection signals from the individual sensors. The oil pressure for the hydraulic actuator 14 is controlled by the control valve 17. While vibrations produced in the vehicle body by the irregularities of the road surface are absorbed and damped by the accumulator 20 and the orifice 19, since the cylinder chamber 15 of the actuator 14 communicates with the accumulator 20 via the orifice 19.

Referring now to FIGS. 3 to 6, the operation of the vehicular active suspension apparatus will be described.

Figure 3:
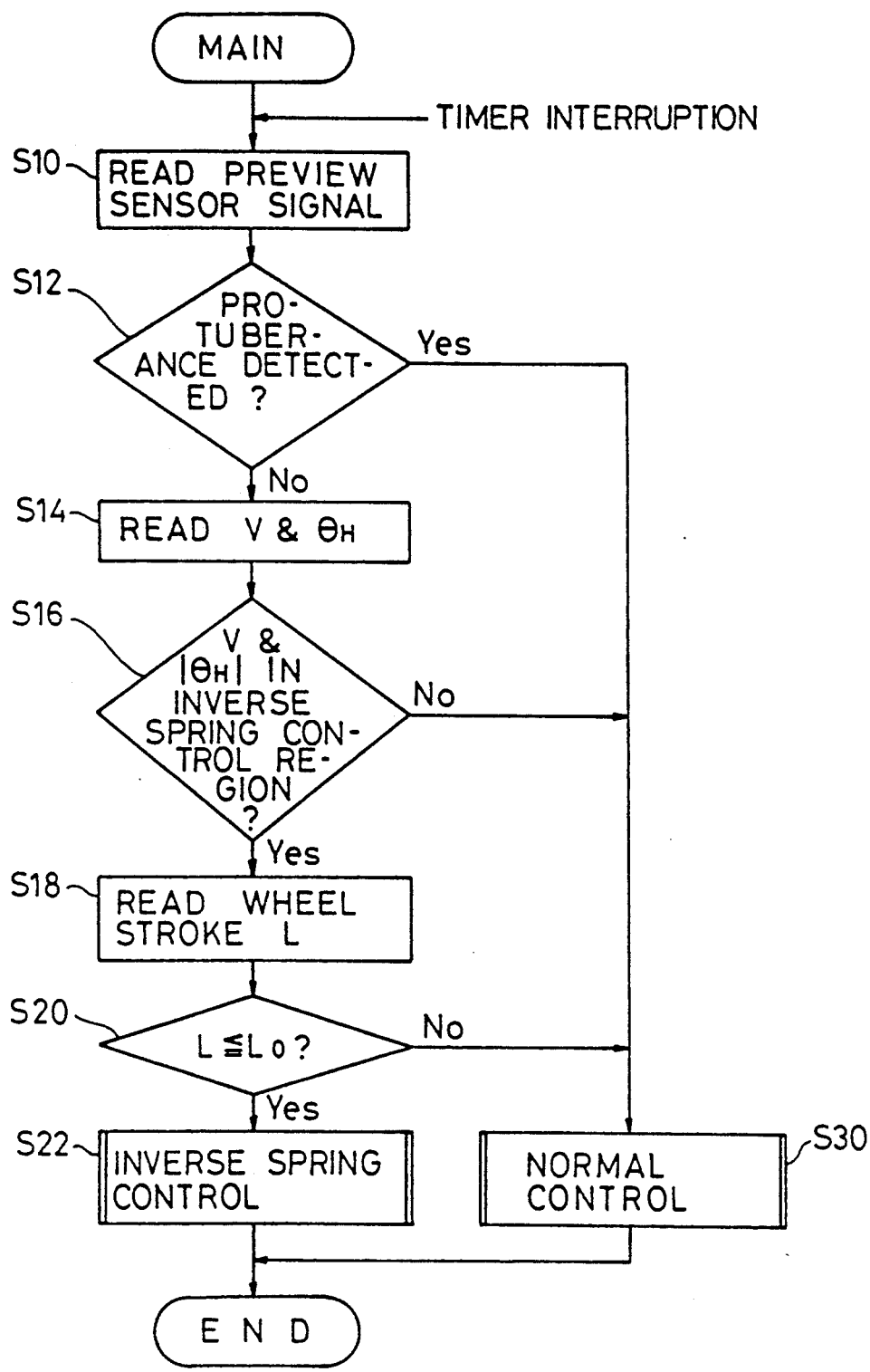
FIG. 3 is a flowchart showing a main program associated with a suspension control.

The controller 30 repeatedly executes the main routine shown in FIG. 3 at intervals of a predetermined cycle.

First of all, the controller 30 reads the output signal from the preview sensor 33 in Step S10 of FIG. 3.

Then, based on the output signal from the preview sensor 33 read in Step S10, the controller 30 determines whether or not a protuberance or the like of a size larger than a predetermined size is detected (Step S12).

If the result of the decision in Step S12 is YES, normal control of Step S30, which will be defined below, is executed. Thereupon, the present routine ends, and the program is returned.

The normal control, in contrast with inverse spring control which will be described in detail in connection with Step S22, is such a control that the relative displacement between the vehicle body and the wheel is restricted, for thereby damping vibrations of the vehicle body. More specifically, in the active suspension apparatus shown in FIG. 1, the vibrations of the vehicle body, which occur when the vehicle body is subjected to an external force, are detected by the vehicle height sensor 32 or the sprung G sensor 31, and the opening of the control valve 17 is adjusted in dependence on an output from a corresponding one of the sprung G or vehicle height sensors 31 and 32, so as to control the supporting force of the hydraulic actuator 14. (As a result of this control, the equivalent spring constant of the suspension is varied.) The aforementioned control is carried out in a relatively wide variety of road conditions, including rough roads. In this case, the suspension characteristic is stiffened, as compared with a case where the later-mentioned inverse spring control is effected.

If the result of the decision in Step S12 is NO, a vehicle speed V detected by the vehicle speed sensor 34 and a steering angle $\theta_H$ detected by the steering angle sensor 35 are read (Step S14).

Figure 4:
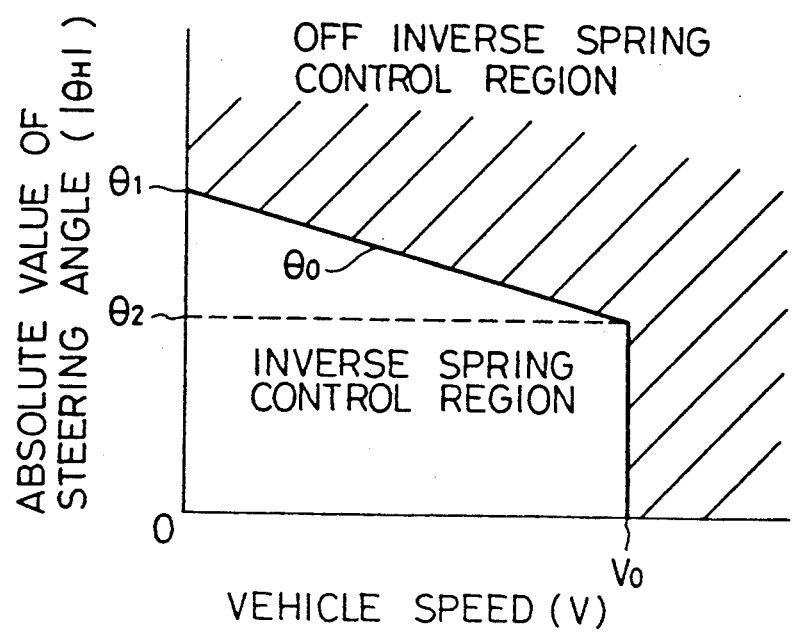
FIG. 4 is a graph illustrating an inverse spring control region defined by the vehicle speed and the absolute value of the steering angle.

Then, the controller 30 determines whether or not the vehicle speed V and the absolute value $|\theta_H|$ of the steering angle $\theta_H$ are within an inverse spring control region shown in FIG. 4 (Step S16).

The object of this operation is to prohibit execution of the inverse spring control, for thereby preventing the running stability from being lowered, during high-speed running and steering operations.

The inverse spring control region is a region which is defined by the vehicle speed V and the absolute steering angle value $|\theta_H|$, that is, a region defined by a straight line which is indicative of the vehicle speed V at a predetermined value $V_0$ (V=$V_0$) and a straight line along which the absolute value $|\theta_H|$ decreases at a fixed rate, from a value $\theta_1$ to a value $\theta_2$ intermediate between zero and the value $\theta_1$, the range of the vehicle speed V between zero and $V_0$. A predetermined steering angle $\theta_0$ is defined as a steering angle which is set so as to decrease at the fixed rate from the value $\theta_1$ to the value $\theta_2$ as the vehicle speed V increases.

If the result of the decision in Step S16 is NO, that is, if the absolute steering angle value $|\theta_H|$ is greater than the value of the predetermined steering angle $\theta_0$ or if the vehicle speed V is higher than the predetermined vehicle speed $V_0$, the normal control of Step S30 is executed. Thereupon, the present routine ends, and the program is returned.

If the result of the decision in Step S16 is YES, the program proceeds to Step S18, whereupon a stroke L of the wheel 8 detected by the vehicle height sensor 32 is read.

The stroke L of the wheel 8 is read because it must be continually monitored, since the inverse spring control is the so-called diverging-system control and the stroke L is lengthened by the execution of the inverse spring control. Also, a certain limitation is placed on the stroke L of the wheel 8 to prevent the system from further diverging beyond this certain limitation.

Then, it is determined whether or not the stroke L of the wheel 8 is not longer than a predetermined small stroke $L_0$ (Step S20).

If the result of the decision in Step S20 is NO, the normal control of Step S30 is executed. Thereupon, when the processing in the normal control subroutine ends, the program is returned to Step S10. If the result of the determination at Step S20 is still negative (No), i.e., L>$L_0$, the normal control is repeatedly carried out, whereby the initial vehicle body vibration is gradually damped by the aforementioned vibration damping effect of the normal control.

Figure 5:
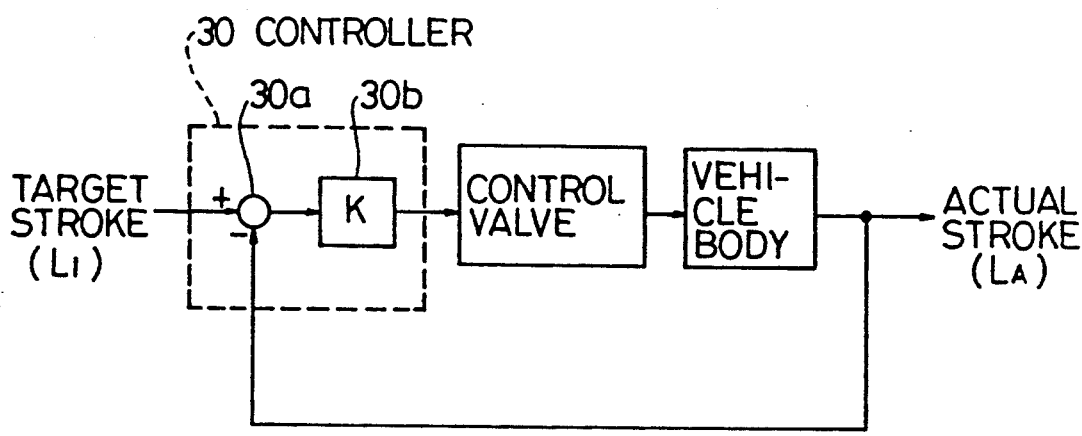
FIG. 5 is a block diagram showing a construction of an equivalent circuit for executing inverse spring control.

If the result of the decision in Step S20 is YES, the inverse spring control is executed in Step S22. As shown in FIG. 5, an equivalent circuit of a stroke feedback system is arranged in the controller 30. Thus, the difference between a target stroke $L_I$ and an actual stroke $L_A$ of the wheel 8 is calculated in a subtracter circuit 30a, and the difference is multiplied by a control gain K in an amplifier circuit 30b, whereby hydraulic control of the control value 17 is executed. Thus, the supporting force of the hydraulic actuator 14 is controlled. Since this equivalent circuit is characterized by the diverging-system control, the control gain K should be set so as to equivalently lower the spring constant at least enough to cancel the friction force of the suspension unit 12.

More specifically, in the operation of the suspension unit 12, when the suspension unit 12 is urged to contract, the hydraulic actuator 14 acts on the suspension to promote the contraction, and hence the suspension unit 12 further contracts beyond the stroke amount permitted in a case where the actuator 14 does not act thereon. When the suspension unit 12 is urged to extend, on the other hand, the hydraulic actuator 14 acts on the suspension to promote the expansion, so that the suspension unit 12 further extends beyond the stroke amount permitted in the case where the actuator 14 does not act thereon. Thus, the stroke of the wheel 8 is lengthened.

Since the system is the diverging system, moreover, a certain limitation should be placed on its operation. This is a limitation based on the predetermined upper limit value $L_0$ of the suspension stroke L executed in Step S20. In the meantime, if the actual stroke $L_A$ becomes to be slightly smaller than the upper limit stroke $L_0$ immediately after the start of the inverse spring control which has just started in accordance with the positive determination at Step S20, the result of the determination at Step S20 becomes negative so that the normal control is entered. In this case, the comfort of the vehicle to ride can be adversely affected by the inverse spring control executed only for a short period of time. To obviate such inconveniences, preferably, the upper limit stroke $L_0$ is set again to a larger value (larger by 10 mm, for instance) if the inverse spring control is once started, so that the inverse spring control continues until the actual stroke $L_A$ exceeds the thus reset value.

On the basis of a controlled variable calculated in this manner, the controller 30 changes the value of the electrical current for driving the control valve 17, and thereby controlling the oil pressure applied on the hydraulic actuator 14. Also, the equivalent spring constant of the actuator 14 is adjusted to the second spring constant which is lower than the first spring constant for the normal control, that is, the spring force is reduced to a very low level.

Figure 6:
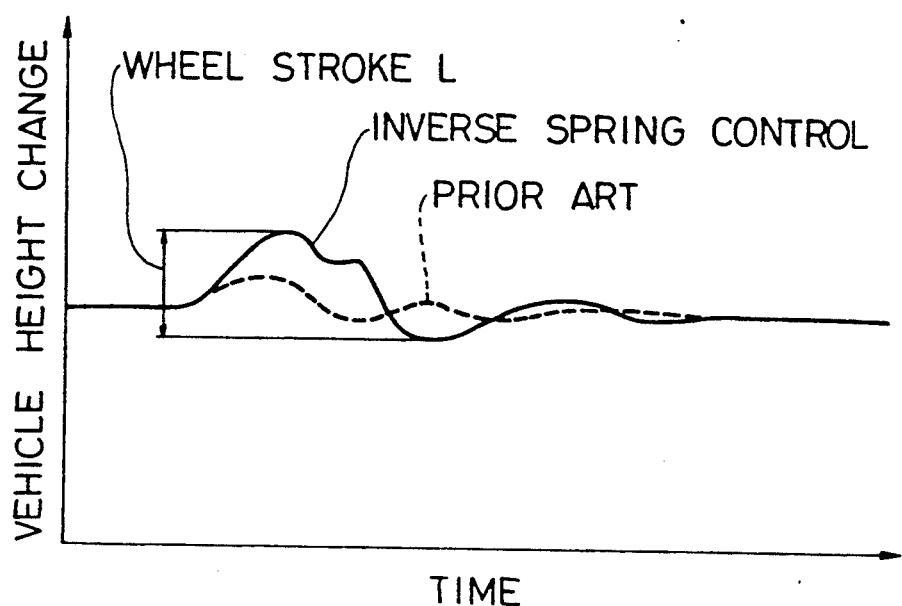
FIG. 6 is a graph showing the time-based change of vehicle height detected by a vehicle height sensor, for illustrating the effect of the vehicular active suspension apparatus.

FIG. 6 illustrates the effect of the inverse spring control. Since the equivalent spring constant of the hydraulic actuator 14 is lowered, the stroke L of the wheel 8 increases, and at the same time, the frequency cycle becomes longer. Thus, the automobile can provide a soft feeling or a more comfortable ride.

Finally, the present routine ends, and the program is returned.

In an actual control of the active suspension apparatus, the aforesaid controlled variable outputted during the normal control or the inverse spring control and the controlled variable calculated for some other purpose, such as retention of the vehicle height, are added together. The operation of the control valve 17 is controlled in accordance with the resultant controlled variable.

According to the embodiment described above, the inverse spring control is executed only when the vehicle speed V is not higher than the predetermined vehicle speed $V_0$. Alternatively, however, a second predetermined vehicle speed $V_1$ may be set between zero and the value $V_0$ so that the inverse spring control can be prohibited when the vehicle speed V is lower than the second predetermined speed $V_1$. More specifically, in this case, the inverse spring control may be prohibited when the vehicle speed is in a very low speed range, e.g., less than 3 km/hr., in which the inverse spring control is not so effective.

According to the above-described embodiment, moreover, the predetermined upper limit value $L_0$ is provided for the stroke L of the wheel 8, in order to restrain the divergence of the system, and the inverse spring control is prohibited when stroke L exceeds the value $L_0$. The means for restricting the divergence of the system is not, however, limited to the arrangement described above, and the divergence of the system may be restricted on the basis of any other suitable variable.

Figure 7:
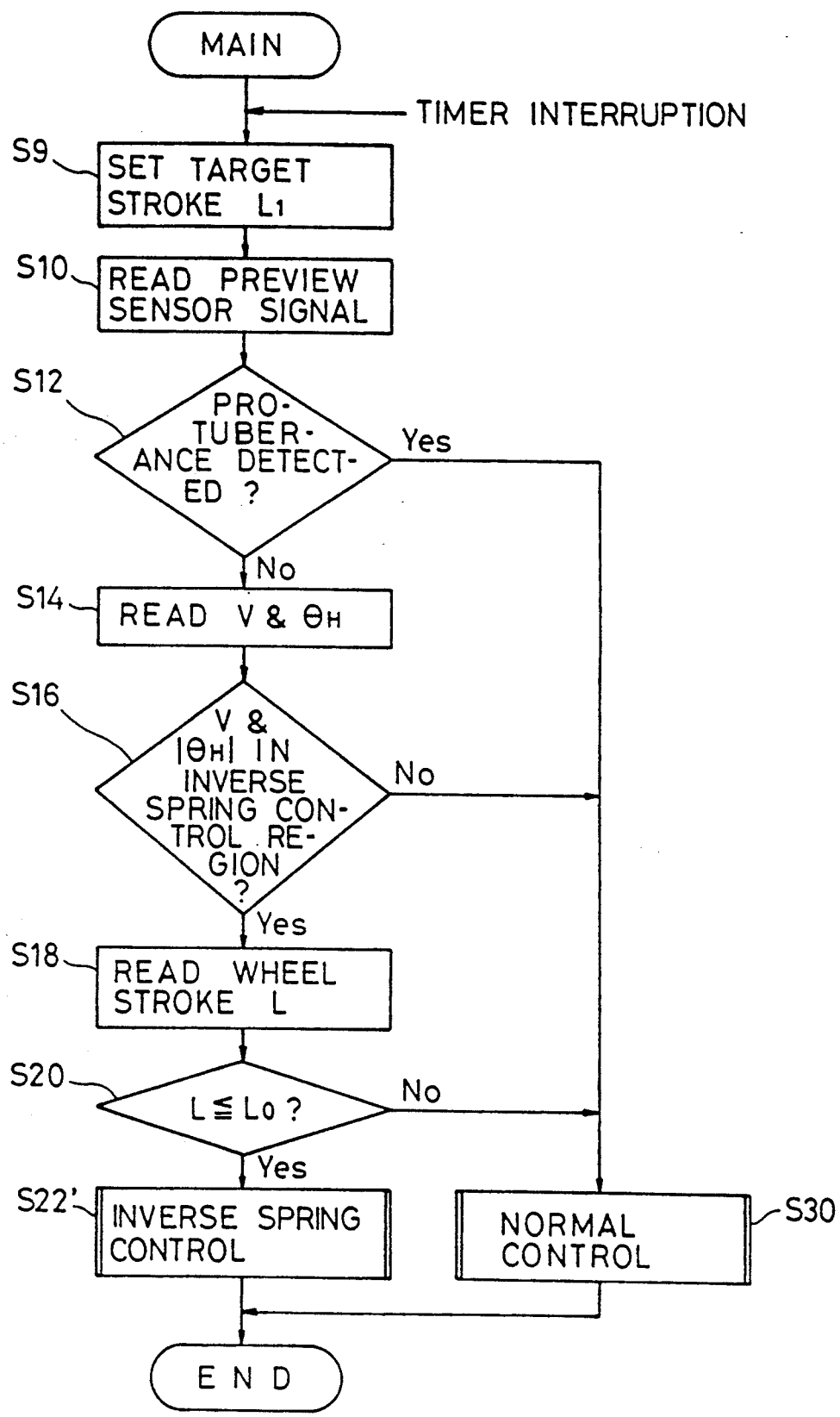
FIG. 7 is a flowchart showing a main program for executing inverse spring control according to a second embodiment of the present invention.
Figure 8:
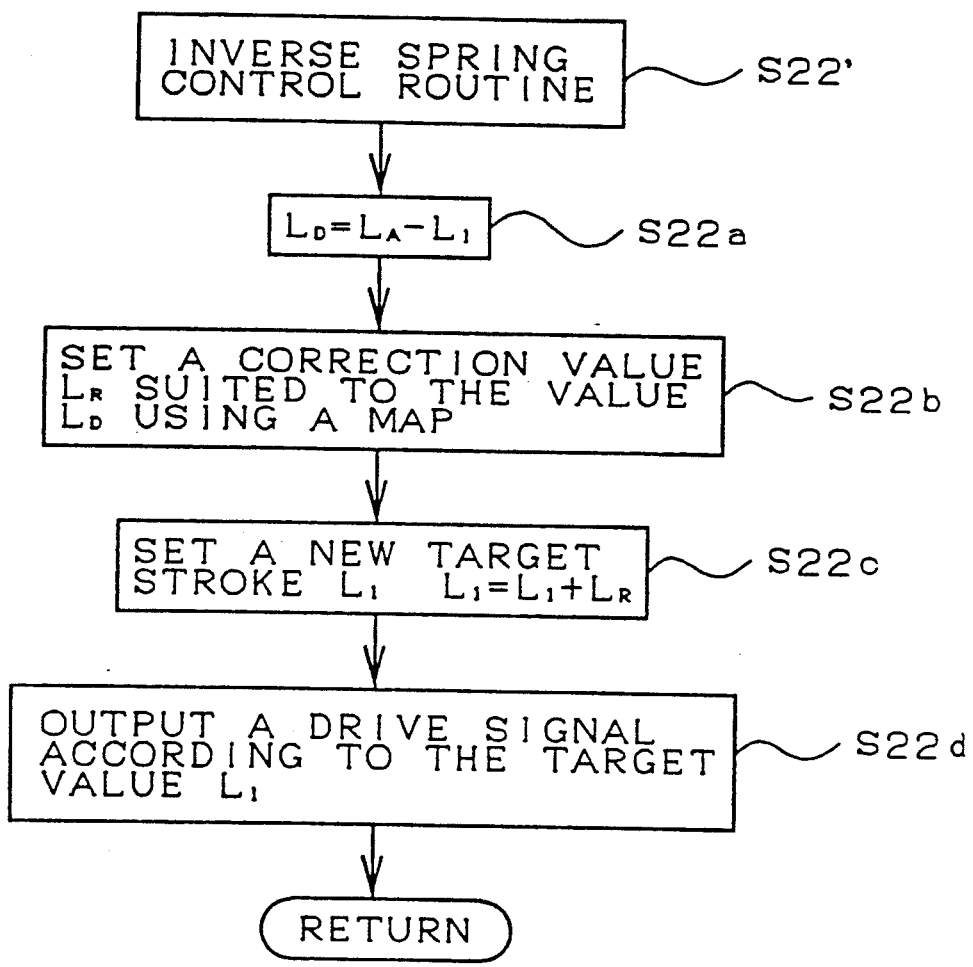
FIG. 8 is a flowchart showing an inverse spring control routine shown in Step S22' illustrated in FIG. 7.

FIGS. 7 and 8 show another embodiment of the inverse spring control. As compared with the flowchart shown in FIG. 3, the flowcharts illustrated therein are different only in that Steps S9 and S22' (S22a-S22d) are newly added. The remaining steps which are the same as the corresponding steps illustrated in FIG. 3 are shown by like symbols, and detailed explanations thereof are omitted.

The inverse spring control shown in FIG. 7 is executed at intervals of a predetermined cycle. Each time this routine is executed, a target stroke $L_1$ is set at Step S9. The target stroke $L_1$ is set to an appropriate value suited to the vehicle weight or the vehicle speed, for instance. As in the first embodiment, the inverse spring control shown in Step S22a and the subsequent steps are executed, if irregularities of a size larger than a predetermined size are not detected at Step S12, and if it is determined at Step S16 that the vehicle runs in an inverse spring control area, and if such a condition that an amount L stroke of the hydraulic actuator 14 is equal to or less than a predetermined value $L_0$ is determined at Step S20.

In the inverse spring control according to the second embodiment, at first, the target stroke amount $L_1$ is subtracted from an actual stroke amount $L_A$ to calculate a difference between these amounts as an amount $L_D$ ($=L_A-L_1$) of stroke change.

Then, a correction value $L_R$ corresponding to the thus obtained stroke change amount $L_D$ is read out from a map stored in the controller 30. FIG. 9 shows a relationship between the stroke change amount $L_D$ and the correction value $L_R$, and this relationship is stored in the map. The setting is made in such a manner (Step 22d) that the correction value $L_R$ has an upper limit value for increased stroke change amounts $L_D$ and a lower limit value for decreased stroke change amounts $L_D$. Next, Step S22c is entered in which the target stroke $L_1$ set at Step S9 is corrected by the correction value $L_R$, as shown in the following equation, to thereby set a target stroke value again.

$$L_1 = L_1 + L_R$$

The controller 30 provides the control valve 17 with a drive signal suited to the target stroke $L_1$ set in the aforementioned manner, so that the stroke of the hydraulic actuator 14 is brought in conformity with the target stroke $L_1$ thus set. The control valve 17 operates to control the hydraulic oil pressure supplied to the hydraulic actuator 14, so as to increase or decrease the supporting force of the hydraulic actuator.

In the inverse spring control, if the actual stroke amount is larger than the target stroke $L_1$, the difference $L_D$ assumes a positive value. At this time, the correction amount also assumes a positive value. As apparent from the foregoing equation, the new target stroke $L_1$ is set to such a value which increases the stroke, if the actuator 14 starts to be expanded. As a consequence, the supporting force of the actuator 14 is increased, so that its stroke action is promoted. On the other hand, if the actual stroke amount is smaller than the target stroke $L_1$, the difference $L_D$ assumes a negative value, and, at this time, the correction value also assumes a negative value. Thus, if the actuator 14 starts to be contracted, a new target stroke $L_D$ is set to such a value which causes the stroke to decrease, as apparent from the equation given above, whereby the supporting force of the actuator 14 is decreased to prompt the stroke action to the negative direction.

Meanwhile, the normal control in the inverse spring control according to the second embodiment is the same as that explained with regard to the first embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An active suspension apparatus for a vehicle having a body and a wheel, comprising:
    an actuator being extensible and retractable and provided between the vehicle body and the wheel so that the force of the vehicle body to support the wheel is adjustable;
    vibration input sensing means for detecting a vibrating input to the vehicle body;
    control means for controlling the supporting force of said actuator by a normal control such that the relative displacement between the vehicle body and the wheel is restricted for damping vibrations of the vehicle body and an inverse spring control for preventing the running stability from being lowered during high-speed running and steering operations in accordance with the vibration input detected the vibration input sensing means and thereby restraining the stroke of the wheel; and
    a forward road surface sensor for detecting the size of irregularities of a road surface in front of the vehicle, and said control means controlling the supporting force of said actuator by said inverse spring control such that the equivalent spring constant of a suspension is lowered, and thereby lengthening the stroke of the wheel, when surface irregularities of a size less than or equal to a predetermined size are detected by said forward road surface sensor and controlling the supporting force of said actuator by said normal control when surface irregularities of a size larger than said predetermined size are detected by said forward road surface sensor.

2. A suspension apparatus according to claim 1, wherein said vibration input sensing means comprises vehicle height sensing means for detecting a relative distance between the wheel and the vehicle body, and said inverse spring control is executed in a manner such that the supporting force of the actuator is controlled in accordance with the difference between a target relative distance and an actual relative distance which is detected by the vehicle height sensing means.

3. A suspension apparatus according to claim 2, wherein the target relative distance is corrected in accordance with the difference between the target and actual relative distances, and the supporting force of said actuator is controlled in such a manner that the actual relative distance is brought to be in conformity with the thus corrected target relative distance.

4. A suspension apparatus according to claim 2, wherein said control means fails to execute the inverse spring control when the relative distance detected by the vehicle height sensing means is longer than a predetermined relative distance.

5. A suspension apparatus according to claim 2, wherein said vehicle height sensing means detects the relative distance between the wheel and the vehicle body measuring the stroke of the actuator.

6. A suspension apparatus according to claim 3, wherein said vehicle height sensing means detects the relative distance between the wheel and the vehicle body measuring the stroke of the actuator.

7. A suspension apparatus according to claim 1, further comprising vehicle speed sensing means for detecting the speed of the vehicle, and wherein said control means fails to execute the inverse spring control when the vehicle speed detected by the vehicle speed sensing means is higher than a predetermined vehicle speed.

8. A suspension apparatus according to claim 1, further comprising steering angle sensing means for detecting the steering angle of the vehicle, and wherein said control means fails to execute the inverse spring control when the absolute value of the steering angle detected by the steering angle sensing means is larger than the value of a predetermined steering angle.

9. A suspension apparatus according to claim 8, further comprising vehicle speed sensing means for detecting the speed of the vehicle, and wherein said predetermined steering angle is set so as to decrease as the vehicle speed detected by the vehicle speed sensing means increases.

10. A suspension apparatus according to claim 1, wherein said control means includes a control valve for controlling oil pressure, and said actuator comprises a hydraulic actuator for increasing or decreasing the supporting force pressurized by oil pressure which is controlled by the control valve.

11. A suspension apparatus according to claim 1, wherein said forward road surface sensor comprises an ultrasonic sensor attached to the front portion of the vehicle body so as to be directed forward and diagonally downward with respect to the vehicle body.

12. The active suspension apparatus according to claim 1, wherein said control means executes said normal control adjusts an equivalent spring constant of said actuator to a first spring constant and executes said inverse spring control adjusts said equivalent spring constant of said actuator to a second spring constant lower than said first spring constant to lengthen the stroke of the wheels of the vehicle.

13. A method for controlling an active suspension apparatus for a vehicle, comprising the steps of:
    (a) supplying a force from the vehicle by an actuator to support the wheels of the vehicle;
    (b) detecting a vibration input to the vehicle body;
    (c) detecting the size of irregularities of a road surface in front of the vehicle;
    (d) controlling the supporting force of said actuator in accordance with said vibration input detected at said step (b) for thereby restraining the stroke of the wheels;
    (e) executing inverse spring control for preventing the running stability from being lowered during high-speed running and steering operations to control the supporting force of said actuator based on said vibration input detected at said step (b) such that the equivalent spring constant of a suspension is lowered for thereby lengthening the stroke of the wheels when surface irregularities of a size less than or equal to a predetermined size are detected at said step (c); and (f) executing normal control such that the relative displacement between the vehicle body and the wheel is restricted for damping vibrations of the vehicle body to control the supporting force of said actuator based on said vibration input detected at said step (b) when surface irregularities of a size larger than said predetermined size are detected at said step (c).

14. A method according to claim 13, further comprising the steps of detecting a relative distance between the wheel and the vehicle body and executing said inverse spring control such that the supporting force of said actuator is controlled in accordance with the difference between a target relative distance and an actual distance which is detected.

15. A method according to claim 14, further comprising the steps of correcting the target relative distance in accordance with the difference between the target and actual relative distances and controlling the supporting force of said actuator such that the actual relative distance is brought to be in conformity with the thus corrected target relative distance.

16. A method according to claim 14, wherein said inverse spring control fails to be executed when the relative distance detected is longer than a predetermined relative distance.

17. A method according to claim 14, wherein the relative distance detected is between the wheel and the vehicle body measuring the stroke of said actuator.

18. A method according to claim 13, further comprising the steps of detecting the speed of the vehicle and preventing said inverse spring control from being executed when the vehicle speed detected is higher than a predetermined vehicle speed.

19. A method according to claim 13, further comprising the steps of detecting the steering angle of the vehicle and preventing said inverse spring control from being executed when the absolute value of the steering angle detected is larger than the value of a predetermined steering angle.

20. A method according to claim 19, further comprising the steps of detecting the speed of the vehicle and setting said predetermined steering angle so as to decrease as the vehicle speed detected increases.

21. A method according to claim 13, further comprising the steps of controlling oil pressure by a control valve and increasing or decreasing the supporting force pressurized from oil pressure by a hydraulic actuator which is controlled by said control valve.

22. A method according to claim 13, wherein said step (c) further comprises the step of detecting the size of irregularities of said road surface forward and diagonally downward in front with respect to the vehicle body by an ultrasonic sensor attached to the front portion of the vehicle body.

23. A method according to claim 13, wherein said normal control adjusts an equivalent spring constant of said actuator to a first spring constant and said inverse spring control adjusts said equivalent spring constant of said actuator to a second spring constant lower than said first spring constant to lengthen the stroke of the wheels of the vehicle.

* * * * *